(12) United States Patent
Gould et al.

(10) Patent No.: US 10,552,321 B2
(45) Date of Patent: Feb. 4, 2020

(54) FLEXIBLE BUFFER SIZING IN GRAPHICS PROCESSORS

(71) Applicant: Microsoft Technology Licensing, LLC, Redmond, WA (US)

(72) Inventors: Jason Matthew Gould, Woodinville, WA (US); Ivan Nevraev, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 10 days.

(21) Appl. No.: 15/871,864

(22) Filed: Jan. 15, 2018

(65) Prior Publication Data
US 2019/0042410 A1 Feb. 7, 2019

Related U.S. Application Data

(60) Provisional application No. 62/541,332, filed on Aug. 4, 2017.

(51) Int. Cl.
*G06T 15/00* (2011.01)
*G06F 12/06* (2006.01)
*G06F 12/0802* (2016.01)

(52) U.S. Cl.
CPC ...... *G06F 12/0646* (2013.01); *G06F 12/0802* (2013.01); *G06T 15/005* (2013.01);
(Continued)

(58) Field of Classification Search
CPC ... G09G 5/363; G06F 12/0284; G06F 9/5016; G06F 3/14; G06F 12/0646; G06F 12/0802; G06F 2212/1048; G06F 2212/302; G06F 2212/455; G06F 2212/604; G06F 2212/608; G06F 12/023; G06F 12/0862;
(Continued)

(56) References Cited

U.S. PATENT DOCUMENTS 5,835,958 A 11/1998 Long et al.
6,058,457 A 5/2000 Tremblay et al.
(Continued)

FOREIGN PATENT DOCUMENTS

WO 03094479 A1 11/2003

OTHER PUBLICATIONS

"International Search Report and Written Opinion Issued in PCT Application No. PCT/US2018/035519", dated Sep. 20, 2018, 11 Pages.

*Primary Examiner* — Hashem Farrokh

(57) ABSTRACT

Enhanced data buffer control in data systems is presented herein. In one example, a method of handling data buffer resources in a graphics processor includes establishing a pool of available memory pages tracked by memory pointers for use in a growable data structure. Responsive to requests by at least a shader unit of the graphics processor for space in the growable data structure in which to write shader data, the method includes providing to the shader unit at least write pointers to locations within memory pages from the growable data structure in accordance with data sizes indicated in the requests. Responsive to exceeding a threshold fullness of the growable data structure, the method includes allocating at least one further memory page from the pool of available memory pages for inclusion in the growable data structure.

17 Claims, 6 Drawing Sheets

(52) U.S. Cl.
CPC ............. *G06F 2212/1048* (2013.01); *G06F 2212/302* (2013.01); *G06F 2212/455* (2013.01); *G06F 2212/604* (2013.01); *G06F 2212/608* (2013.01)

(58) Field of Classification Search
CPC ............ G06F 12/0875; G06F 12/0895; G06T 15/005; G06T 1/60
USPC ........................................................ 711/129
See application file for complete search history.

(56) References Cited

U.S. PATENT DOCUMENTS

| | | | |
|---|---|---|---|
| 6,233,651 B1 | 5/2001 | O'Neill et al. | |
| 6,603,683 B2 | 8/2003 | Hsu et al. | |
| 7,102,646 B1 | 9/2006 | Rubinstein et al. | |
| 7,178,002 B2 | 2/2007 | Boucher | |
| 7,533,237 B1* | 5/2009 | Nordquist | G06F 12/0284 711/100 |
| 8,056,079 B1 | 11/2011 | Martin et al. | |
| 8,174,534 B2 | 5/2012 | Jiao | |
| 9,250,953 B2 | 2/2016 | Kipp | |
| 9,542,227 B2 | 1/2017 | Jones et al. | |
| 9,569,348 B1 | 2/2017 | Deming et al. | |
| 2003/0220987 A1* | 11/2003 | Pearson | G01C 23/00 709/220 |
| 2004/0160449 A1* | 8/2004 | Gossalia | G06F 3/14 345/543 |
| 2007/0083866 A1 | 4/2007 | Mani et al. | |
| 2013/0305009 A1 | 11/2013 | Durant et al. | |
| 2015/0123980 A1* | 5/2015 | Nalluri | G06T 1/20 345/522 |
| 2017/0063733 A1* | 3/2017 | Lawson | H04L 49/901 |

\* cited by examiner

FLEXIBLE BUFFER SIZING IN GRAPHICS PROCESSORS

RELATED APPLICATIONS

This application hereby claims the benefit of and priority to U.S. Provisional Patent Application 62/541,332, titled "FLEXIBLE BUFFER SIZING IN GRAPHICS PROCESSORS," filed Aug. 4, 2017, which is hereby incorporated by reference in its entirety.

BACKGROUND

Computing systems, such as personal computers, portable computing platforms, gaming systems, and servers, can include graphics processors along with main/central processors. These graphics processors, sometimes referred to as graphics processing units (GPUs), can be integrated into the central processors or discretely provided on separate add-in cards, among other configurations. User applications, operating systems, video games, or other software elements can interface with GPUs using various application programming interfaces (APIs) that allow for standardized software/logical interfaces between the software elements and various GPU hardware elements.

Most GPUs can have specialized roles for rendering both two-dimensional (2D) and three-dimensional (3D) graphics data for display, such as graphics data from operating systems, productivity applications, entertainment media, scientific analysis, gaming software, or other graphics data sources. GPUs can also be employed in general purpose processing environments, such as artificial intelligence, machine learning, neural nets, statistical analysis, and cryptocurrency mining. Within the GPUs, various internal stages can process graphics data into rendered images for display on a suitable display device. In many GPUs, these internal stages comprise a graphics pipeline that can take representations of scenes or user interfaces and render these into images for output to various display devices. Among these GPU stages are shader stages and other stages and functions that provide graphical details, surface texture mapping, colors, shadows, or other elements for portions of rendered images.

Overview

Presented herein are implementations of multiple growable data queue and stack structures for use in highly parallelized processing environments. In one example, a method of handling data buffer resources in a graphics processor includes establishing a pool of available memory pages tracked by memory pointers for use in a growable data structure. Responsive to requests by at least a shader unit of the graphics processor for space in the growable data structure in which to write shader data, the method includes providing to the shader unit at least write pointers to locations within memory pages from the growable data structure in accordance with data sizes indicated in the requests. Responsive to exceeding a threshold fullness of the growable data structure, the method includes allocating at least one further memory page from the pool of available memory pages for inclusion in the growable data structure.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
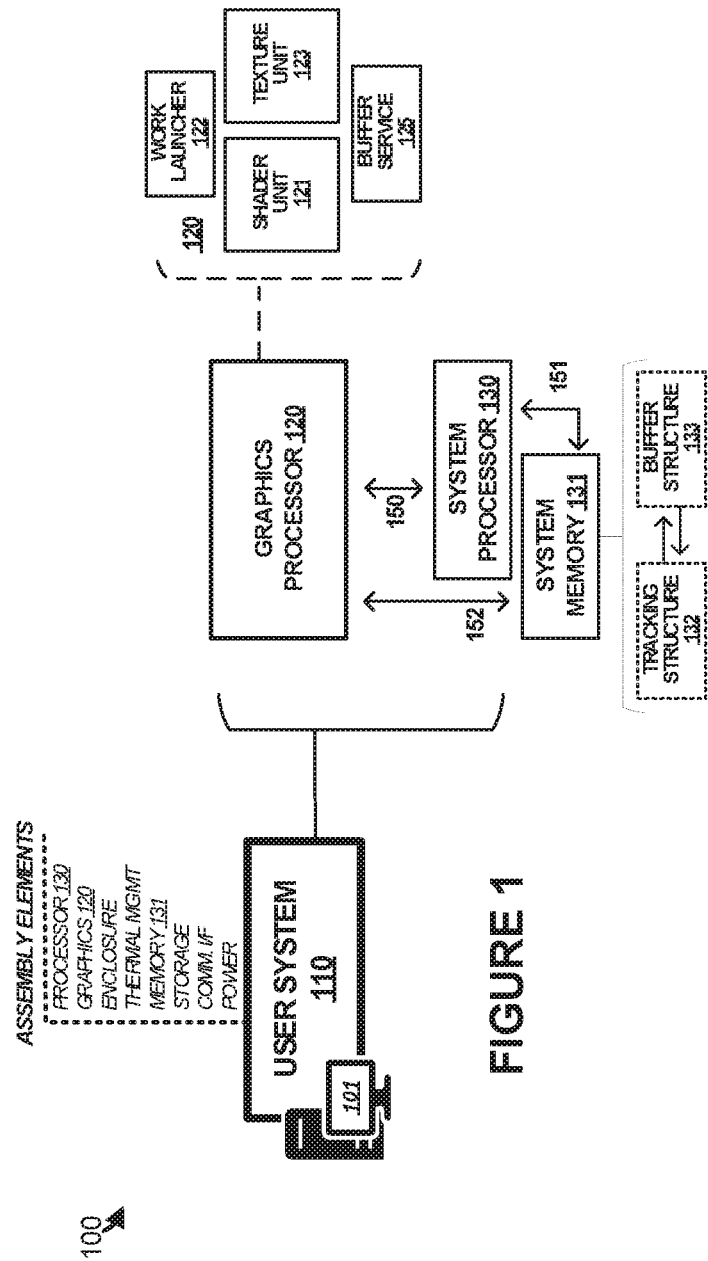
FIG. 1 illustrates a data processing environment in an implementation.

Graphics processing units (GPUs) include various internal hardware components, such as processing stages, memory elements, and other pipelined processing elements. GPUs and associated support software can render two-dimensional (2D) and three-dimensional (3D) graphics. In some examples, GPUs apply shading and texture data to target objects within a 3D space rendered to a user. Shading data provides for varying levels of light, darkness, and color within renderings, while texture data provides surface details, surface graphics, texturing, or other surface features to represent objects with desired surface details. Texture and shading processes can be processor-intensive and require large amounts of memory to accomplish. User content that is rendered by GPUs, such as video game content, is expected to continue growing in complexity over time, but graphics hardware constraints such as bandwidth and memory capacity are not expected to grow at a similar rate. The techniques discussed herein provide improved shaders and associated data buffer elements for GPUs. The enhanced buffer structures herein allow for flexibility in sizing of the buffers in response to current graphics processing demands, providing for more efficient usage of memory resources, as well as batching data operations and sorting among data operations for shading operations in graphics processors.

Graphics-centric software developers, such as video game developers or other programmers, often encounter scenarios where one shader generates data and stores the data into a data structure, and then another shader consumes that data from the data structure. Some examples employ data, structures where data can be simultaneously produced and consumed. Further examples use first-in, first-out (FIFO) buffer arrangements that require multiple FIFOs with arbitrary amounts of data stored into each, but the amount of data to be stored into each FIFO is not known up front. The examples herein can provide alerts can be generated when new data is added to FIFOs, so that associated scheduling elements can launch shaders to consume the new data. However, existing GPUs fail to achieve efficient use of these data structures, and it can be extremely difficult to efficiently change a size of a buffer once established. For example, GPUs can perform atomic "compare exchange" instructions on memory, for difficult and inefficient to implementations of a ring buffer using shader instructions.

Presented herein are efficient implementations of multiple growable data queue and stack structures for use in highly parallelized environments. The examples herein include methods of handling data buffer resources in graphics processors. In one examples, a pool of available memory pages is established (which are either tracked by memory pointers in a list of free pages, or tracked in a linked list associated with the growable data structure descriptor). Shader elements of the graphics processor can make requests for space in which to write new data, or to read previously-written data, and the examples herein provide operations for efficiently coalescing requests and de-coalescing results for many shader threads in parallel. Responsive to the shader requests, addresses of memory are calculated to be read or written for many shader threads in parallel. Operations for automatically growing or shrinking a growable data structure, are provided responsive to the requests received. Prefetching can be handled from a free page list, as an optimization for the write requests, and prefetching ahead in a linked list as an optimization for the read requests. Tracking out-of-order reads and writes is provided herein, in order to distinguish and summarize memory regions which have been allocated but not yet written, from regions whose writes are complete but whose data has not been read, from regions where writes are complete and reads have started, and from regions whose data has been both written and fully consumed. Moreover, tracking and summarizing status of the various growable structures discussed herein is provided, in order to assist prioritization of dequeuing their respective data. Also, handling of out-of-range errors is provided efficiently, such as requests for reading data which has not yet been written.

The examples herein further provide for enhanced and efficient implementations for many concurrent shaders to operate with relation to growable data structures. Additionally, the enhanced operations allow shaders to submit data into a data structure (FIFO, queue, or stack, among others), and allow the data structure to be dynamically adjustable in size, such as dynamically "growable" data structures. However, some of the enhancements herein can be applied to statically-sized data structures. The associated hardware advantageously allocates a new portion of memory to write to when a current one fills up. The enhanced operations further provide for simultaneous reads and writes to the growable data structure, provide for multiple threads to consume the data, automatically notify a scheduler of the addition of work into a programmable subset of growable data structures, allow multiple growable data structures to be accessed in parallel, and eliminate nearly all latency, except for the act of reading and writing actual data to memory.

Although the enhanced growable data structures discussed herein can be applied to any data processing and handling environment, the examples herein are discussed the context of a graphics processing environment. Specifically, shader functionality of a graphics processing environment is discussed, which might be employed in a graphics processor, GPU, or other data processing system. Furthermore, although FIFO, queue, or stack data structures are discussed, other data structures can also employ the enhanced features herein to include 'growable' functionality. The growable data structures employed in shader operations are provided by memory, such as random-access memory (RAM), among other forms of memory.

Shader functionality is employed by GPUS for applying shading, shadows, color intensity, or other properties to elements within a graphical scene that is to be rendered. Shaders typically are massively parallel elements, such as software elements or hardware-implemented elements. In modern graphics processing, shaders are provided in massive quantities, such as thousands or more, all attempting to perform similar operations simultaneously. For example, GPUs can have multiple hardware shader units, such as 4-64 or more, with each of these shader units handling a plurality of threadgroups, such as 64 threadgroups. Each threadgroup can also include thousands of threads operating simultaneously, such as 32-1000 threads each. Designing hardware to manage thousands of memory requests for individual threads, or thousands of push/pop requests simultaneously can be difficult, and thus, managing associated data buffering operations can be challenging in GPUs. In shaders, list management can be complex, while existing GPU opcodes and handling techniques exist, these exiting techniques can be challenging to implement, and can be inefficient on existing hardware. To provide enhanced shader operation and memory buffering operation, various elements are provided herein, such as a buffer management element or Stack/Queue Manager (SQM) that hold descriptors for shaders, can perform atomic operations and handle read-write pointers for shaders and associated data buffering.

During operation, shaders push data into buffers for later servicing. The buffer management elements provided herein can have 'direct' and 'indirect' methods of data handling. In direct methods, memory data bus bottlenecks can be created during high-volume operations by shaders. However, while direct methods can still be bottlenecked on memory bandwidth, the direct method is dramatically more efficient than existing algorithms on standard hardware today, with the indirect method achieving performance gains as well. Direct methods support stacks, while indirect methods do not. Both direct and indirect methods allow write combining, with direct methods slightly better at write combining than indirect methods. Direct methods may not have access to the full bandwidth of the memory bus, while indirect methods typically would.

However, the enhanced 'indirect' methods discussed herein can handle high-volume operations for efficient usage of memory data busses. In the indirect methods, shaders request space for data to be written during shader operations. The buffer management element assigned to a requested growable data structure performs various checks to determine if the data space can fit into a remaining size of a current page. The buffer management element returns two pointers to the shader, and a count. The first pointer is where the first one or more threads of the shader can begin writing, the count is how many elements the shader can safely write there, the second pointer is the beginning of a new page where the shader can write its remaining data elements. When the shader has completed writing its data, the shader sends a new message back to the buffer management element, indicating how many data elements the shader wrote to the one or two pages.

Shaders can be instructed to execute 'n' number of threads to process data, such as 64 or 128 threads. The shaders can 'push' or 'pop' data to/from the data buffer in a burst manner for many threads concurrently in a single request to the buffer management element. This effectively compresses request usage for efficient use of memory resources and physical data bus resources. For example, if a shader thread group has 64 threads in it, the associated buffer management element will not have to handle 64 individual "begin push"

requests—the shader hardware (or shader program) can detect that 64 threads all want to push to the same growable data structure, and send a single "begin push—request space for 64 elements" command to the buffer management element. When the buffer management element sends the two pointer addresses and count for the growable data structure back to the shader unit, either hardware or software can be used to decompress the two addresses and count in order to generate safe addresses for each of the 64 threads to write. An identical operation can occur with "begin pop" requests. This write combining and burst reading can thus be performed by the shader to make efficient use of any associated memory bus. During write or 'push' operations, data for many threads can be combined, packed, or otherwise 'compressed' into a single write operation. During read or 'pop' operations, the shader can include enhanced functionality to distribute, unpack, or otherwise 'decompress' the data combined in the read operations to ensure that each thread is given the relevant data for processing. The shader can track this combining and de-combining using various data apportioning and tracking techniques.

For data read operations ('pop') from the buffer, the buffer management element might provide the shader more than one read pointer to more than one page, such as when the associated data spans more than one page, along with a count. The count can indicate how many elements are valid on the first page. Another count can also be provided that indicates how many elements are valid on a second page, in case the shader requests more data than has been written to the buffer. A first pointer can indicate the start location of the data within a page, and the second pointer can indicate the start of the second page that contains further data associated with the read operation. This can be useful when the shader requests more than one entry to be read from the buffer, such as 64 or 128 entries in one example. The 64 or 128 entries might each be associated with a different thread, and these can span more than one page. Thus, multiple pointers can be returned for a read operation. Write combining and burst reading can thus be performed by the shader, even when the buffer grows, to make efficient use of any associated memory bus.

In some examples, a shader "threadgroup" has 32 or more threads in it, and the threadgroup makes requests, while the buffer management element communicates with the threadgroup. Hardware or software is responsible for distributing threadgroup-based results back to the individual threads within that threadgroup. Each thread in a threadgroup can specify a FIFO/Stack ID, and a bit indicating if that thread is "participating or not," For example, each thread in the threadgroup can either ask for 0 or 1 items from a given growable data structure, and a mask might be provided or generated that indicates which threads of the threadgroup are requesting data. In further examples, each thread might be configured to request space for more than one item, with some added implementation logic. When a threadgroup does a "write," this write indicates that each thread in that threadgroup is either participating in the write or not, such as via a mask or other indicator. However, each thread may be writing to completely scattered memory addresses, with these scattered memory addresses handled by standard GPU functionality.

The shader program, the shader unit, the SQM, or some other element between the shader and the SQM typically coalesces the requests. For example FIFOs, all threads writing to "FIFO ID 0" get grouped into a single "begin push" request, all threads writing to "FIFO ID 1" get grouped into a separate "begin push" request, etc. Each SQM can process one "begin" request at a time, though many threads for potentially many threadgroups, depending on the coalescing algorithm) may have contributed to that request. The addresses generated by the SQM are then split apart and sent back to the corresponding shader threads. This de-coalesce operation can be done in the shader program, the shader hardware, the SQM, or some other element between the shader hardware and the SQM Advantageously, the more coalescing that occurs, the better the performance.

Enhanced 'growable' buffer functionality is provided by the elements discussed herein. These growable buffers can be used in graphics processing environments, such as for shader elements, and can be provided using a pool of pointers that tracks free memory 'pages' that can be allocated to growable data structure. A pool is a portion of memory that is subdivided into a plurality of same-sized pages, which can be allocated for use by growable data structures. The enhancements herein can provide hardware or software support for one or more such pools and one or more such growable data structures. Each growable data structure comprises pages from a selected pool. Several growable data structures can allocate from the same pool, and several other growable data structures can be made to allocate from a different pool, depending on use case, and pool page sizes, or other factors. Various pool management implementations are discussed herein, such as ring buffers and bit arrays. However, a pool manager element is included in hardware implementations that the buffer management element can allocate pages from for use in data structures, and free pages to after use in data structures. The pool manager is agnostic about actual page usage, and instead handles the page allocation and de-allocation.

The growable data structures comprise memory pages that form linked list structures. Associated pointers are used by the growable data structures to link among pages that comprise the growable data structures. The buffer management element can implement this linked list structure to track pages in the growable data structures. For example, the buffer management element can reserve the first or last 'n' bytes of pages (such as 8 bytes) to store a pointer to next and/or previous pages. Alternatively, the linked list pointers can be implemented elsewhere, which allows the entire page size to be used for data, instead of reserving a section of each page for the linked list pointers. Advantageously, the enhanced graphics processing operations herein provide for the ability to handle and track multiple different growable buffer data structures which can be allocated among different shader elements or shader threads on-the-fly. Multiple simultaneous growable buffer structures can also be implemented when separation of buffer resources among shaders or shader threads is desired.

Turning first to an example of systems and platforms that can provide at least the above enhancements, FIG. 1 is provided. FIG. 1 illustrates graphics processing environment 100 in an implementation. Environment 100 includes user system 110, graphics processor 120, and system processor 130. In operation, system processor 130 can boot into an operating system (OS) to provide various operations of user system 110 including user applications, data processing services, communication services, storage services, gaming services, or other features of a computing system. Graphics processor 120 can provide graphics processing and rendering services for system processor 130. Graphics processor 120 also provides enhanced operations including operations involving example portions that comprise shader unit 121, work launcher 122, texture units 123, among other elements. Although graphics processor 120 is shown as a separate element that communicates over at least link 150 with processor 130 in FIG. 1, it should be understood that other examples can provide graphics processor 120 within system processor 130, such as when system processor 130 integrates elements of graphics processor 120.

User system 110 comprises a computing system or computing assembly, such as a computer, server, tablet device, laptop computer, smartphone, gaming system, entertainment system, storage system, or other computing system, including combinations thereof. User system 110 includes several components detailed in FIG. 1. These components include graphics processor 120 and system processor 130, as mentioned above. Graphics processor 120 and system processor 130 can each comprise one or more integrated elements, such as processor cores, cache memory, communication interfaces, graphics cores, and north bridge elements, among other integrated elements not shown for clarity. Furthermore, user system 110 can include various assembly elements, such as enclosure elements, thermal management elements, memory elements, storage elements, communication interfaces, power system elements, among other elements not shown for clarity. When graphics processor 120 and system processor 130 are installed in user system 110, these assembly elements provide system resources and context for the operation of system processor 130. Display 101 can be included with user system 110.

Enclosure elements can include structural support elements, cases, chassis elements, or other elements that house and structurally support the further elements of user system 110. Thermal management elements can include heatsinks, fans, heat pipes, heat pumps, refrigeration elements, or other elements to manage and control temperature of user system 110. Memory elements can comprise random-access memory (RAM), cache memory devices, or other volatile memory elements employed by system processor 130 or graphics processor 120. Storage elements comprise non-volatile memory elements, such as hard disk drives (HDDs), flash memory devices, solid state drives (SSDs), or other memory devices which store operating systems, applications, or other software or firmware for user system 110. Communication interfaces can include network interfaces, peripheral interfaces, storage interfaces, audio/video interfaces, or others which communicatively couple user system to external systems and devices. Graphics elements can include display interfaces, displays, touchscreens, touch interfaces, user interfaces, among others. Power system elements typically include voltage regulator circuitry, controller circuitry, power filtering elements, power conditioning elements, power conversion elements, power electronics elements, or other power handling and regulation elements. Power system elements receive power from an external source, such as from batteries or an external power source, and converts/regulates the power to produce voltages and currents to operate the elements of user system 110.

User system 110 can communicate over one or more communication links such as one or more network links. Example communication links can use metal, glass, optical, air, space, or some other material as the transport media. Example communication links can use various communication interfaces and protocols, such as Internet Protocol (IP), Ethernet, USB, Thunderbolt, Bluetooth, IEEE 802.11 WiFi, or other communication signaling or communication formats, including combinations, improvements, or variations thereof. Communication links can be direct links or may include intermediate networks, systems, or devices, and can include a logical network link transported over multiple physical links.

User system 110 can include software such as an operating system, logs, databases, utilities, drivers, networking software, user applications, data processing applications, gaming applications, and other software stored on computer-readable media. Software of user system 110 can comprise one or more platforms which are hosted by a distributed computing system or cloud-computing service. Software of user system 110 can comprise logical interface elements, such as software defined interfaces and Application Programming Interfaces (APIs). Software of user system 110 can be used to generate data to be rendered by graphics processor 120 and control the operation of graphics processor 120 to render the graphics for output to one or more display devices.

Graphics processor 120, system processor 130, and system memory 131 can communicate over associated links 150-152. Example links can use metal, glass, optical, air, space, or some other material as the transport media. The links can use various communication protocols and communication signaling, such as computer busses, including combinations or variations thereof. The links can be direct links or may include intermediate networks, systems, or devices, and can include a logical network link transported over multiple physical links.

System memory 131 typically comprises any physical or virtual allotment of random access memory (RAM) or dynamic RAM, among other components, including interfacing elements. System memory 131 can be shared among system processor 130 and graphics processor 120, or partitioned to be exclusive to either system processor 130 and graphics processor 120.

FIG. 1 illustrates graphics processor 120 in an implementation, which can be an example of a graphics processing unit (GPU) comprising one or more graphics cores. Graphics processor 120 can provide graphics processing and rendering services for a system processor that indicates data and instructions over link 150, such as system processor 130 in FIG. 1. Graphics processor 120 can include one or more stages or internal components that can process content/data into rendered images for display. Graphics processor 120 may communicate with system memory 131, or to a dedicated graphics memory, depending on the configuration. Although these elements can include those shown in FIG. 1 for 121-125, it should be understood that other configurations are possible.

Example elements of graphics processor 120 in FIG. 1 include one or more among shader unit 121, work launcher 122, texture units 123, and buffer service 125. Shader unit 121 can comprise one or more single-instruction, multiple data (SIMD) units, while the work launcher 122 will instruct the SIMDs to begin running a shader program. The shader SIMDs and the work launcher can communicate with buffer service 125. One or more texture units 123 (or other form of memory interface) are included, and each shader SIMD requests memory through a texture unit or memory interface. Buffer service 125 can communicate with system memory 131 through an associated memory interface. Although buffer service 125 might comprise hardware elements in FIG. 1, in other examples buffer service 125 can be implemented using one or more software elements. Individual shaders programs determine color, shadow, and intensity information during rendering processes, and in some examples comprise pixel shading features. Shader unit 121 can communicate with texture unit 123 to determine colors/shading for regions of textures, which can be referred to as texels. One or more buffer managers can be included in buffer service 125 to provide many of the enhanced memory and data structure handling operations discussed herein.

Figure 2:
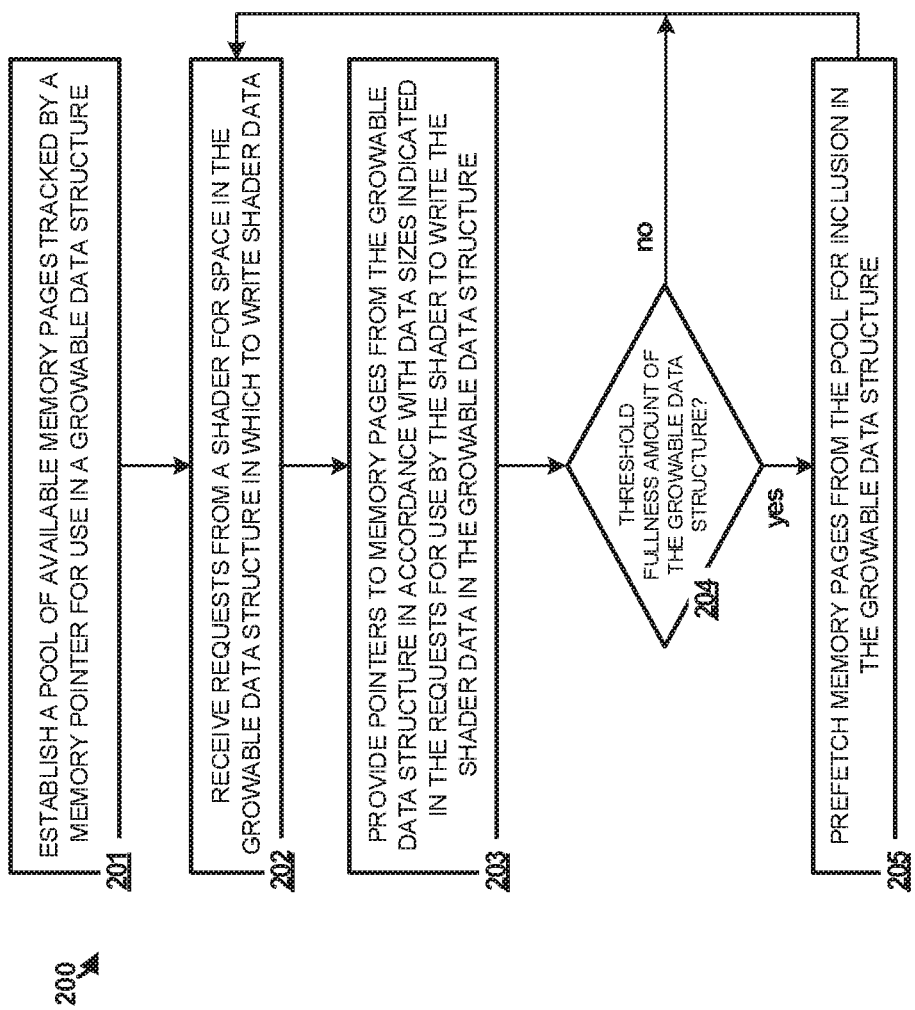
FIG. 2 illustrates a method of operating data buffer handling systems in an implementation.

FIG. 2 illustrates an example method 200 of operating data buffer handling systems. The operations of FIG. 2 are discussed in the context of elements of FIG. 1. However, the operations of FIG. 2 can also apply to elements of FIGS. 3-6. In FIG. 2, graphics processor 120 establishes (201) a pool of available memory pages for use in a growable data structure, each of the available memory pages tracked by a memory pointer. In some examples, buffer service 125 or an associated pool manager element, can establish this pool of available memory pages using tracking data structure 132. A growable data structure, such as buffer structure 133, can be increased or decreased in size according to dynamic needs of data processing elements, such as shaders of a GPU. The pool of available memory pages is typically tracked in an associated tracking data structure 132 using pointers to pages of memory prefetched or pre-allocated for later use. Tracking data structure 132 can comprise a ring buffer structure, among other data structure types. Pointers to each of the memory pages can thus be stored in tracking data structure 132.

Buffer service 125 can receive (202) requests from data processing elements, such as shader unit 121, for space in buffer structure 133 in which to write shader data or other associated data. Buffer service 125 provides (203) pointers to memory pages from buffer structure 133 in accordance with data sizes indicated in the requests. These pointers can be used by the data processing elements for writing the shader data into buffer structure 133.

Buffer service 125 also tracks the amount of data written into buffer structure 133. Various thresholds can be established to monitor when to grow or shrink buffer structure 133. for example, when a threshold fullness amount is reached (204) for buffer structure 133, or if the requests indicate write sizes above a threshold amount, then buffer service 133 can increase the size of buffer structure 133 using memory pages from the pool of available memory pages tracked by tracking structure 132. Buffer service 125 can prefetch (205) memory page addresses, such as from a free page list, for inclusion in buffer structure 133 from the pool of available memory pages. In this manner, memory page addresses are ready for use in buffer structure 133 ahead of time, and buffer service 125 can quickly respond to data buffer needs of shader unit 121 in a dynamic fashion. Moreover, when a threshold amount of data has been removed from buffer structure 133, such as responsive to consumption of shader data in one of the memory pages, buffer service 125 can return the memory page into the pool of available memory pages. To return these memory pages into the pool, buffer service 125 can reintroduce pointers to those memory pages into tracking structure 132.

Some portions of the tracking structure 132 may be located in system memory 131 (such as the free page lists discussed herein), but many other portions might be located within buffer service 125 (such as the FIFO descriptors), or might be located in system memory 131 but cached/prefetched in buffer service 125 (such as the free page list, or the linked list pointers). In addition, other various tracking structures can be employed, and are typically differentiated from one another. First, a buffer tracking structure can be established which stores various "thresholds" for each buffer structure. Second, a tracking list of free pages can be established. Tracking structures for the pointer to the head and tail of the list of free pages can be established. Also, "linked list" pointers, can either located within the associated buffer structure themselves, or location in a separate structure. Tracking structures for per-page "bytes/elements consumed" and "bytes/elements added" counters can be established, which can either be embedded in the beginning or end of each page in the buffer structure (next to the linked list pointers), or can be held in a separate structure.

Figure 3:
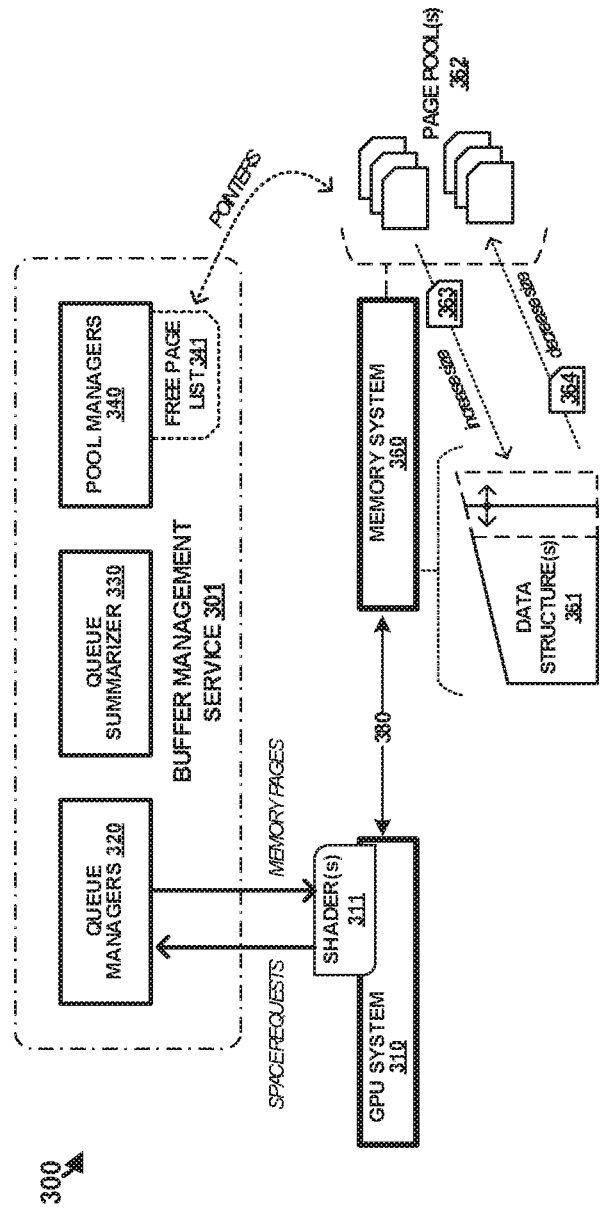
FIG. 3 illustrates data buffer handling systems and processes in an implementation.

FIG. 3 illustrates data buffer handling systems and processes in an implementation. In FIG. 3, data processing environment 300 includes graphics processing unit (GPU) system 310, buffer management service 301, and memory system 360. GPU system 310 comprises one or more GPUs controlled by a host processor and coupled over an associated data bus or data link, such as a PCIe (Peripheral Component Interconnect Express) link. This host processor (not shown in FIG. 3 for clarity) might comprise central processing unit (CPU). GPU system 310 is communicatively coupled to memory system 360 over one or more memory busses 380. GPU system 310 might include elements of buffer management service 301, and all of the elements of FIG. 3 might be integrated into a single chip device, system-on-a-chip, GPU, or add-in card for a computing system, among other configurations. In some examples, GPU system 310 includes hardware processing elements comprising buffer management service 301. In other examples, GPU system 310 includes software processing elements comprising buffer management service 301.

Queue managers 320 comprise one or more software/hardware processes or services configured to receive space requests for memory pages from data processing elements, such as shaders 311. Queue managers 320 provide memory page addresses, via pointers, to shaders 311 for use in shader operations or other data processing operations. Queue managers 320 can provide a dynamic amount of buffer space for use by shaders 311. This buffer space can be provided by data structure 361 which can grow or shrink according to dynamic needs of shaders 311. Queue managers 320 can communicate with pool managers 340 to dynamically size the associated data structure 361 and retrieve pointers to free pages.

Pool managers 340 comprise one or more software/hardware processes or services configured to maintain one or more pools 362 of memory pages that can be allocated for use by shaders 311. Pool managers 340 track available/free memory pages using free page list 341. Free page list 341 comprises one or more data structures that track currently available memory pages using associated pointers to the memory pages. Free page list 341 can reside in system memory, though a portion of free page list 341 may be prefetched by pool manager(s) 340, for efficiency. Page pool 362 resides in memory system 360, such as in RAM, GPU memory, system memory, or other associated memory locations. Free pages can be added into and removed from data structure 361 according to present memory needs of shader 311, or other data processing elements of GPU system 310. When the amount of available space in data structure 361 falls below a particular threshold, then new pages 363 can be allocated to data structure 361 in anticipation of usage by associated shaders. Optionally, when a threshold excess quantity of free pages are allocated into data structure 361, these can be returned or de-allocated as released pages 364. These released pages can be returned to pool 362 for use by other data structures.

Although pool 362 is typically predetermined in size, such as ~1 gigabyte (GB), adjustments can be made to pool 362 during operation if data structure 361 or other data structures use more pages from pool 362 than presently available. Typically, pool 362 can use a fixed virtual address range, but the associated GPU memory translation service can be employed to add or remove physical pages from pool 362 based on the current needs. For example, if pool 362 is mostly empty, but some other program needs a lot of physical memory, then many pages can be removed from the "free page list" so the pool manager does not hand those pages to the queue managers. The affected pages can be deleted from the page tables, to be used for some other purpose. Requests to "un-back" a page would typically be generated by the CPU, although a work launcher or shader could instead generate an "un-back" request as well.

Queue summarizer 330 comprises one or more software/hardware processes or services configured to monitor elements of buffer management service 301. These monitored elements can include queue managers 320 and pool managers 340, and activities thereof. Queue summarizer 330 also can monitor status of pool 362, free page list 341, free page usage, and data structure 361. This status can indicate usage statistics, fullness, page churn, page allocation, page de-allocation, size/fullness of the page pool, free pages indicated in free page list 341, or other status. One example function of queue summarizer 330 is to inform the work launcher when one or more element has been pushed into any of data structures 361, so the work launcher can launch a shader that will consume that data.

Figure 4:
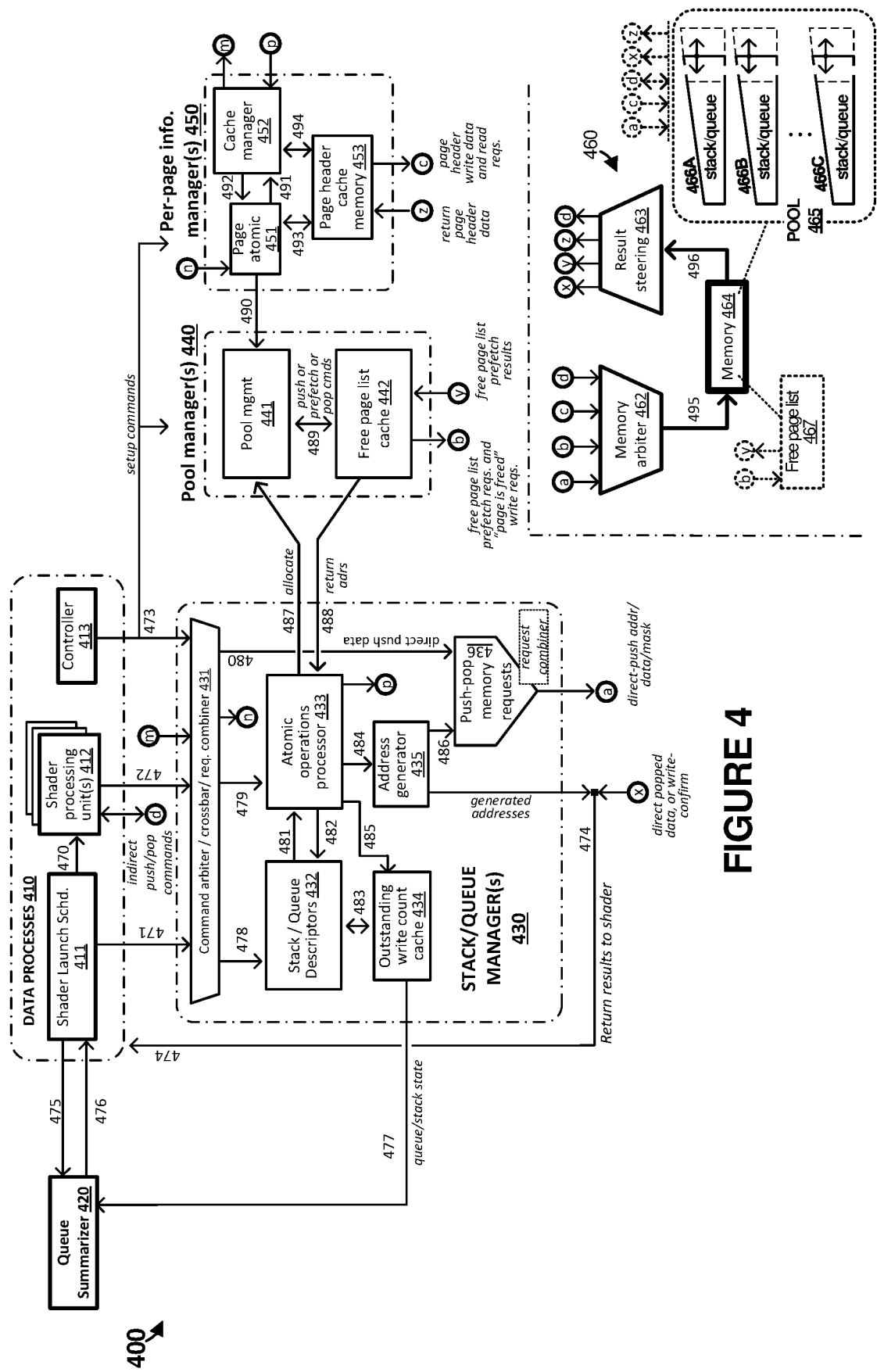
FIG. 4 illustrates data buffer handling systems and processes in an implementation.

Turning now to a further detailed operation of the elements of FIGS. 1 and 3, FIG. 4 is presented. FIG. 4 illustrates a further example data buffer handling system and processes in an implementation. FIG. 4 includes processing environment 400. Processing environment can include elements of central processing units (CPUs), graphics processing units (GPUs), or other computing and data processing systems. For example, processing environment 400 includes data processes 410 that further comprise shader launch scheduler 411, shader processing units 412, and controller 413. Shader launch scheduler 411, shader processing unites 412, and controller 413 can comprise elements of associated GPUs or CPUs. FIG. 4 also includes one or more buffer management elements comprising stack/queue manager (SQM) 430, pool manager 440, per-page information manager 450, and queue summarizer 420. Although only one instance of each of the stack/queue and buffer management elements are shown in FIG. 4, in further examples multiple instances can be included and employed for specifically assigned shader elements or for load balancing among many shader elements. Furthermore, although in FIG. 4 the growable data structures are referred to as stacks/queues, any suitable data structure type can be employed, including various sub-types of queues, such as FIFOs. Moreover, the examples herein also support random-access growable structures, or multi-use queues write once, read more than once, then free; or write once, then read/modify/write, then read again).

The buffer management elements included in FIG. 4 are responsible for interfacing with one or more enhanced stacks or queues described herein employed as a buffer, such as example buffer pool 465 in memory 464. One or more shader processing units (SPUs) 412, each processing associated GPU shader threads (typically in a single-instruction, multiple-data (SIMD) fashion), will be connected to one or more SQMs 430 via one or more associated data busses (i.e. daisy-chained, branched, cross-barred, or otherwise), such that each SPU can send commands to each SQM, and such that any given stack/queue described herein can be exclusively owned/managed by one corresponding SQM.

For each stack/queue buffer managed by an associated SQM 430, the associated SQM locally stores information/descriptors 432 relevant to the operation of the growable stacks/queues. SQM 430 comprises enough local data storage to include information/descriptors for dozens of stacks/queues. This information can include:
  sizes of each element stored in the stack/queue
  sizes of the stack/queue
  counts of elements allowed in the pages
  base addresses in memory of the stack/queue
  for pages currently being written—indications of an index representing "current write pointer" (WPTR)
  for pages currently being read—indications of an index representing "current read pointer" (RPTR)
  for growable buffers, this information can also include:
    pointers to the base address of the current page being written
    pointers to the base address of the current page being read
    pointers to the base address of the next page to read
    indications of the amount of space remaining to be written in the current write page
    indications of the number of elements remaining in the current read page.

These stacks/queues managed by the SQM can have multiple supported combinations of features or mode styles/types. Example style/types include a read/write style/types. These read/write style/types can include Temporarily Write-only, Temporarily Read-Only as a stack, Temporarily Read-Only as a queue, Temporarily Read-Only as random access, Read-Write as a stack, Read-Write as a queue, and Write as a queue but Read as random access. Further modes include whether the SQM directly reads/writes the data to the buffer (direct access), or whether it only provides proper arbitration and guidance to the shaders but lets shaders access the data directly (indirect access). In indirect examples, shader processing units 412 can read/write elements 466 via link (d-d) using indirect push/pop commands. Even further example stack/queue anodes can include Not Growable, Growable (manually freed pages), and Growable (auto-freed pages).

Depending on whether stack/queue operation is direct or indirect, as mentioned above, shaders may send various commands to SQMs 430, to interface with the stacks/queues. For "direct" access style of buffers, push and pop commands are employed for the SQMs to directly interact with the stacks/queues. Push commands include when the shaders provide data, associated SQMs responsively allocate space for the data, the associated SQMs write the data to memory, and the associated SQMs optionally also returns addresses to the shaders indicating where the data was written. Pop commands include when the associated SQMs retrieve and provide data to the shaders, and provide error indicators if no data is available.

For "indirect" access style of buffers, various commands are included that allow the shaders to inform the associated SQMs of intended operation. Specifically, Push_alloc, Push_done, Pop_alloc, and Pop_done commands can be employed. In a Push_alloc command, the shaders inform associated SQMs that the shaders want to place data in the stacks/queues, and the associated SQM provides the shader a safe memory address to write. Also, for Push_alloc commands, associated SQMs informs the appropriate per-page info manager that space has been allocated. In a Push_done command, the shaders inform an associated per-page info manager that the shaders are done writing data to the stacks/queues, and therefore the data is safe to be consumed. In Pop_alloc commands, the shaders inform associated SQMs that the shaders want to retrieve data from the stacks/queues, and the associated SQMs provide addresses to read, or some "empty" indicator (such as a NULL pointer)

to indicate no data remains. Also, for Pop_alloc commands, associated SQMs informs the appropriate per-page info manager that space has been allocated. In a Pop_done command, the shaders inform an associated per-page info manager that the shaders have finished reading data from the stacks/queues. In examples involving non-growable ring buffers, the space just read from can be reused for writes. Additionally, further commands can be employed for random-access growable auto-free buffers. A Write_flush command can indicate to the associated SQMs to flush any cached data to memory. A Read_done_for_autofree command can indicate to the associated SQMs that the shaders are done reading some data on a given page. An associated per-page info manager will responsively count how many outstanding reads are on a page, and free the page when it is done being used. Depending on the instruction the SQMs will receive either data or addresses from the shaders, and will return "done" indicators for writes, data for reads, or addresses for "alloc" instructions.

To implement growable buffers, multiple SQMs can communicate with one or more shared pool managers 440. Pool managers 440 track lists of free pages for use by hardware components, such as data processes 410. Pool managers 440 can be implemented as ring buffers discussed in the examples herein, or can instead be implemented using bit arrays that indicate which pages are free. The pool ring buffer approach is more flexible, in part because the ring buffer can support arbitrary-sized pools, with arbitrary non-consecutive pages. In contrast, while easier to implement, a bit array is fixed-size, and only supports virtually contiguous pages. If there are multiple SQMs, pool managers 440 will typically be shared such that any given pool manager is accessible to all SQMs. Pool managers 440 effectively implement a special-cased read/write style direct, non-growable ring buffer, which contains a list of pointers to free pages in the pool. When an SQM detects that a growable buffer is going to overflow an associated page, the SQM will request a new page from a pool manager. In order to reduce latency of fetching data from the special-cased pool ring buffer, the ring buffer can either be stored within the pool manager itself, or an automatic prefetching cache can be implemented as part of the pool manager, to pre-load a series of available page pointers. The automatic prefetching cache can be sized appropriately to hide memory latency in a given implementation.

Shader units can be configured to use single-instruction, multiple-data (SIMD) style of operations. Typically, 32 or more shader threads process data together and execute instructions together in a group called a "wave," "wavefront," "threadgroup," or other grouping. Due to this SIMD nature. "push" and "pop" instructions can be executed on 32 or more threads simultaneously. Thus, for example, the SQMs can receive "push" commands with data from 32 or more threads. A mask indicating that some threads are choosing not to participate in the instruction can also be received with the command. To aid in efficiency, the SQMs can implement operations which can atomically allocate space on a current page of a stack/queue, allocate a new page for growable buffers if the current page runs out of room, and write the data (potentially half to one page and half to another page of a growable buffer) for however many threads are in the shader SIMD. The request combiner 431 coalesces requests from a given wavefront, or potentially across multiple wavefronts, into a single command that is passed to the SQM over links 478/479 or to page atomic 451.

To further detail combination of many thread requests into single requests, various elements can detect that a plurality of threads, such as 64 threads, all want to push data to the same growable data structure, such as the same stack/queue. Alternatively, a subset of the requests might be directed to a first stack/queue and another subset directed to a second stack/queue, and more than one combined request can be determined. However, the plurality of requests combined into a single request are employed for requesting space into which data can be pushed (or similarly for request from which data can be popped). Thus, the SQM can receive a single combined request for buffer space for many threads. This process can be referred to as request combining, request coalescing, request grouping, among other similar terms, and typically combines requests from threads of one threadgroup into a single request. If requests indicate more data space than can be provided by a predetermined number of memory pages, such as two or some other suitable threshold, then the requests can be combined into a corresponding number (i.e. 2) coalesced requests instead of a single coalesced request. In some examples, requests can be combined across shader threadgroups or across shader units, such as when these request space within the same growable data structure. The request combining can be performed in various elements, such as in the shader programs, the hardware shader units, crossbar 431, or other elements. In a further example, the request combining can be coordinated among threads that coordinate/cooperate to have one or more designated threads issue the combined request for many different threads. When crossbar 431 is employed to combine requests, advantageously requests over more than one shader unit or threadgroup can be combined.

Responsive to the combined requests, atomic operations processor 433 can identify the requests as combined (or not combined if so configured), split the requests into individual space requests to determine sizing among pages that will be used to fulfill the requests, and return pointers to the requesting threads which indicates push or pop locations in the growable data structure. When the requests indicate enough space to cross page boundaries, atomic operations processor 433 can split the space for the requests across more than one page to ensure that individual threads do not have to cross a page boundary. As indicated above, a threshold for a predetermined number of maximum pages might be established, and thus atomic operations processor 433 can split the space up until the predetermined number of maximum pages is reached.

As work is written into stacks/queues, the SQMs can send or broadcast messages to queue summarizers (QS) 420. QS 420 can receive messages about the current state of stack/queues 466 or buffer pool 465 from outstanding write count cache module 434 over link 477. Moreover, shader launch scheduler 411 can request information for non-empty stack/queues from queue summarizer 420. Shader launch scheduler 411 can then provide results related to the current status of stack/queues 466 or buffer pool 465 to shader launch scheduler 411. These messages can indicate stack/queue status/properties, such as "the buffer is full," "32 new entries have been added to this queue," "the queue is empty," "a page has been allocated," or "a pool is nearly out of free pages," among other messages. Additionally, error messages can be sent by SQM 430 to QS 420 such as "pop was executed when no data was available," "push was executed, but the buffer was out of room," or "push_done/pop_done was received, but not expected," among other error messages.

QS 420 can be programmed to assign priorities to various stacks/queues based on load balancing considerations among shader threads or shader elements. Moreover, QS 420 can be programmed to assign priorities to various stacks/queues based on order in a task graph, based on how many work items are available to be processed in a given pool ring buffer, based on availability of resources, or based on other considerations, including combinations thereof. QS 420 can internally track this information per queue/stack. Scheduler 411 can instruct QS 420 to find one of the highest-priority stacks/queues owned by SQMs 430 which has the most urgent data/work to be processed. Based on criteria, QS 420 can provide information back to scheduler 411 about the corresponding stack/queue so the scheduler can launch a new shader thread group to process data from that stack/queue. QS 420 can respond to queries issued by other processes related to the stack/queue fullness or other status/properties of the stacks/queues. For example, as mentioned, a process can query QS 420 to determine which stack/queue has the most relative amount of data yet to service or 'work' to do, and prioritization can be determined based in part on this amount of work for the particular stack/queue. Stacks/queues can be drained according to a current fullness for efficient work-loading of shader operations. QS 420 can provide fullness status using various indicators, such as a 2-bit indicator with "empty," "1-31 entries," "32-1000 entries," or "greater than 1000 entries," among other thresholds and indicators.

Turning now to a further discussion of the elements and operation of FIG. 4, one or more growable data structures are included in FIG. 4. Specifically, memory 464 can include stack/queues 466A-466C which can each hold data related to operations of shader elements of data processes 410. Memory elements 460 illustrate memory interface elements that storage and retrieve data in memory 464. Memory arbiter 462 handles arbitration among various data input/requests over link 495 with memory 464. Result steering module 463 handles transfer of memory output over link 496 to various elements of FIG. 4. Lettered in/out nodes are included in FIG. 4 for clarity, namely nodes a, b, c, d, m, n, p, x, y, and z, which illustrate interconnections among associated elements.

SQM 430 interfaces with the shader elements and other control elements of data processes 410. In operation, data processes 410 can initiate commands and data for handling by SQM 430 over links 471-472. Prior to this, controller 413, which might comprise a CPU or other processing element, can issue one or more setup commands over link 473 to elements 430, 440, and 450 to initialize hardware instances of elements 430, 440, and 450, buffer pool 465, instances of stacks/queues 466, indicate base addresses for stacks/queues, or other setup and control instructions. The setup commands can indicate to elements 430, 440, and 450 how many stacks/queues there will be in memory, and initial states of the pool free page list. In direct push/pop handling, SQM 430 handles these commands with respect to stacks/queues 466 on behalf of the shader elements. Moreover, SQM 430 is responsible for providing updates based on data activity in stacks/queues 466 with regard to page pointers, read/write pointers, and other pointers related to stacks/queues 466. SQM 430 can provide status information on stacks/queues 466 or buffer pool 465, among other status for elements 430, 440, and 450, to queue summarizer 420.

Command arbiter/crossbar/request combiner 431 acts as a front-end interface to data processes 410. The command arbiter/crossbar functionality can arbitrate and transfer commands issued by data processes 410 for use by selected elements of SQM 430 over selected links 478, 479, and 480. These commands can include commands to fetch stack/queue descriptors over link 478, commands to begin push, pop, direct push, or direct pop operations over link 479, and commands/data for direct data push over link 480, among other commands.

The request combiner functionality of element 431 can include combining multiple requests for burst commands. During write or 'push' operations, the request combiner functionality can include enhanced functionality to combine, pack, or otherwise 'compress' data for many threads into a single write operation. In a further example, a plurality of shader threads can request space for reading or writing shader data, and the plurality of requests can be merged or combined by request combiner 431 into a single request for one or more bytes of space. The response to that request, which includes associated pointers into memory pages and indicates valid space left, can then be unpacked by hardware or software when being returned to the shader threads, such that each requesting shader thread receives a unique pointer to memory that it can read or write. Advantageously, many shader thread space requests can be processed simultaneously. The request combiner functionality can pack the "pop" requests together from multiple threads, so elements 432/433/435/436 and/or elements 451/452/453 only have to handle one single combined request, rather than 32 or more thread-sized requests. During read or 'pop' operations, path 474 or units 412 can include enhanced functionality to distribute, unpack, or otherwise 'decompress' the data combined in the read operations to ensure that each shader thread is given the relevant data for processing.

Stack/queue descriptors module 432 includes functionality to provide descriptors, "current read pointers" (RPTRs) for stacks/queues 466, "current write pointers" (WPTRs) for stacks/queues 466, and the like, to atomic operations processor 433 over link 481. Stack/queue descriptors module 432 can also provide information related to the pointers to outstanding write count cache 434 over link 483. Stack/queue descriptors module 432 receives updates to RPTRs, WPTRs, current page status, and the like from atomic operations processor 433 over link 482. Atomic operations processor 433 handles processing individual operations for SQM 430, such as the data push/pop commands into the stack/queue. Furthermore, atomic operations processor 433 updates RPTRs, WPTRs, current page status, counts, and the like, which can be provided to other modules. Atomic operations processor 433 also can provide WPTR done deltas and RPTR allocation deltas to outstanding write count cache 434 over link 485. Atomic operations processor 433 also issues update commands for write allocation pointers and read allocation pointers to cache manager 452 over link (p-p).

Atomic results from atomic operations processor 433 are provided to address generator 435 over link 484. Address generator 435 generates addresses for direct push/pop commands based on the atomic results and delivers these addresses over link 486 to push-pop memory request module 436. Moreover, address generator 435 generates addresses for allocation commands based on the atomic results, and these addresses are returned to shader elements of data processes 410 over link 474. Generated addresses for direct push/pop commands are provided over link 486 to push-pop memory request module 436, which uses these addresses in direct push operations with regard to memory arbiter 462 over link (a-a). Data for direct push is received over link 480, and these combine with the addresses and any associated masking to result in direct push operations over link (a-a) for stacks/queues 466. Direct popped data or write confirmations are provided over link (x-x) from result steering module 463 for delivery to the shaders over link 474.

"Push allocation" functionality of atomic operations processor 433 atomically allocates memory space from a page to be written, checks if that allocation crosses a boundary (such as filling a page). If that boundary was crossed, the push allocation functionality can allocate a new page in order to obtain more space, which might include communicating with pool manager 440 to receive an address/pointer to a new page. The push allocation functionality then makes updates to write pointers, tracks outstanding writes to a page, and directly writes the data, and/or returns addresses to the shaders for where data can be safely written. "Push_done" and "pop_done" commands are sent to per-page info manager 451 directly from request combiner 431 via link (n-n). Per-page info manager 451 decrements the per-page outstanding-write count. If that count reaches zero, the push done functionality, via per-page cache manager 452 over (m-m), can update a "safe to read" pointer (known as the "write done" pointer herein). The push done functionality then updates a count of un-consumed data in the growable stack/queue, and optionally sends a message indicating that the stack/queue has changed state. "Pop allocation" functionality of atomic operations processor 433 atomically allocates memory space from previously-written data, checks if that allocation crosses the end of a page, or whether it crosses the end of the already-written memory, then updates a read pointer, and increments an outstanding reads counter per-page. The pop allocation functionality then directly returns the data, and/or return addresses (and signals indicating validity) to shaders for where to fetch the data. "Pop done" functionality of atomic operations processor 433 atomically decrements, via per-page cache manager 452, the count of outstanding reads to a page, and if that count reaches zero (and the page has been completely written) frees the page. Page-free indications are sent over link 490.

Pool manager 440 handles various operations related to maintaining a pool of memory pages for inclusion into stacks/queues 466 on-demand. Pool manager 440 tracks the free pages in pool 465 using a data structure, such as a ring buffer. Pool manager 440 pre-fetches addresses of pages using that data structure, as needed, according to thresholds of how many entries have been consumed out of its local free page list cache 442. Pool manager 440 can also be instructed to de-allocate pages from stacks/queues 466 in some cases, such as when too many free pages remain in stacks/queues 466. During operation, atomic operations processor 433 communicates with pool management module 441 to handle size management of stacks/queues 466. Atomic operations processor 433 issues commands to pool management module 441 over link 487 to allocate new pages from the pool of available pages into stacks/queues 466. Pool management module 441 can instruct free page list cache 442 to send addresses of these new pages added into stacks/queues 466 to atomic operations processor 433 over link 488. Free page list cache 442 has the addresses of the pages because free page list cache 442 prefetched those addresses out of the free page list. Free page list cache 442 caches a portion of the free page list. Write combining in free page list cache 442 is typically used when enough pool pages are freed that it is expedient to write those page addresses back to the free page list instead of just keeping those page addresses cached locally in free page list cache 442. Pool management module 441 issues push/prefetch/pop commands over link 489 to free page list cache 442. Free page list cache 442 issues page pointer prefetch requests over link (b-b) and memory arbiter 462 to prefetch memory page pointers from free page list 467 in memory 464 for later inclusion into stacks/queues 466. Prefetch results are provided over link (y-y) from result steering module 463, and comprises address pointer information for the prefetched pages. The full free page list 467 is included in memory 464, and free page list cache 442 comprises a cache of a portion of list 467. The cache 442 is instructed to fetch a portion of list 467 as necessary. Specifically, pool management module 441 instructs cache 442 to output one or more of the free page list entries (as addresses/pointers) over link 488 to module 433, or to push some newly-freed pages due to requests over link 490. Pool management module 441 tracks the head and tail of the free page list 467, tracks how many entries have been fetched and not yet consumed in the cache, and then instructs cache 442 to prefetch more entries from free page list 467 if the number of valid cached entries crosses a predetermined threshold. Advantageously, this operation provides for a prefetching read-write cache specialized to work with a ring buffer. In further examples, free page list 467 could be implemented as a stack.

Per-page information manager 450, by way of primarily cache manager 452, handles management of the actual memory pages in stacks/queues 466. This management can include updating per-page read/write data pointers in stacks/queues 466, handling linked list pointers that form stacks/queues 466, tracking fullness/state of each page in stacks/queues 466, and page management transactions on the actual pages used in stacks/queues 466. The page management transactions can comprise handling information for managing the linked list, such as the read/write pointers and the fullness/state which can be stored either to a page header or page footer, or to some separate buffer depending on implementation. Per-page information manager 450 is responsible for caching this page management information, storing it to memory, and loading or prefetching it as appropriate. Per-page information manager 450 also tracks outstanding reads and writes per page, maintains and walks a linked list of pages (one growable stack/queue comprising one linked list of these pages), and frees pages when necessary. Per-page information manager 450 can also fetch or evict per-page information as necessary (such as when the cache becomes full). Page atomic module 451 provides messaging related to when write done pointers have completed pages over link 491, and receives various other messaging from cache manager 452 over link 492. Page atomic module 451 can also receive end_push and end_pop commands from command arbiter 431. Page atomic module 451 receives the end_push and end_pop commands in order to track how many data elements have been fully written, or fully read.

Cache manager 452 and page atomic module 451 interface with page header cache memory over associated links 494 and 493. Page header cache memory 453 comprise cache lines that caches information related to the pages that form stacks/queues 466. Each cache line of page header cache memory 453 can include various information for a corresponding page of stacks/queues 466, such as the address of a next page, address of a previous page, a number of outstanding reads on a current page, a number of outstanding writes on a current page, a currently allocated write pointer on a page, an indicator if the page is the current "write allocation pointer page," and indicator if the page is the current "write is done page," and an indicator if the page is the current read page, among other information. This information may be stored in the headers or footers of individual pages of stacks/queues 466 (such as seen below for elements 601-603 in FIG. 6), or in separate structures within the pool or elsewhere. This information may be cached in page header cache memory 453 for faster/local access by page atomic unit 451. Typically, page header cache memory 453 is of limited size, and may not fit all information relevant to all in-use pages in its memory. Therefore, as necessary, such as if page header cache memory 453 runs out of space, page header cache memory 453 can store associated data into memory 464 (to a location discussed above), and fetch similar data from memory 464 that is associated with a different page. Page header cache memory 453 can be sized large enough that this should not need to be done frequently. Link (c-c) is employed to write data into the individual pages of stacks/queues 466 for updating page headers pertaining to stacks/queues 466, or to issue read requests for page header information pertaining to stacks/queues 466. Link (z-z) is employed to return page header information, and also to indicate when page header information has been fully written. Link (m-m) is employed to provide write done pointer update messages to SQM 430.

Page atomic module 451 receives "push_done" and "pop_done" messages. Per-page information manager 450 also tracks outstanding writes and passes "write_done" messages to 431/432 via link (m-m). In this context, "outstanding" refers to the space that was allocated by push_alloc, but has not been marked complete by a "push done" instruction. Cache manager 452 is informed of "push_alloc" operations via link (p-p). Because there are many shades processing units which may be concurrently doing push_alloc/push_done instructions, the push_done instructions may come back in random order relative to their corresponding push_alloc. There are two example processes to handle this scenario.

A first example process is to track one hit per element per page. One or more bits are set on push_alloc, and those one or more bits are cleared on the corresponding push_done. A "crawler" can walk through the bits, between the current "push_done" and "push_alloc" pointers, and update the "push_done" as the crawler finds bits that are cleared. However, the crawler method has limited performance with a growable data structure, in part because a particular page may hold over a hundred thousand elements, so storing a bit per element would result in a very large data overhead per page.

A second example process is now detailed, which works well with growable data structure implementations, such as stacks/queues 466. Each page has a write-done pointer for writes done within that page, and each stack/queue has a write-done pointer which is updated by updates to the write-done pointer for the oldest page. This second example maintains a count (per page) of outstanding writes, and another count of outstanding reads. Whenever the write count reaches 0, the write done pointer for that page is updated to point to the write alloc pointer of that page. If the write alloc pointer has already moved to another page, the write done pointer is updated to point to the end of the current page. Thus, each page has a "write done" pointer, and a "write alloc" pointer. Cache manager 452 tracks, per-growable data structure, which page is the current "write done" page, and which page is the current "write alloc" page. If a page is the current "write done" page, and its write done pointer is updated, then cache manager 452 sends a message over link (m-m) to SQM 430 to indicate that SQM 430 should update the write done pointer for the corresponding stack/queue 466. When the write done pointer of the write done page reaches the end of the page and the write alloc pointer has moved to a new page), then cache manager 452 instructs SQM 430 to update the write done page pointer to point to the new page. Cache manager 452 also sends a message to itself, indicating that cache manager 452 should inspect the new write-done page, and see if a corresponding write-done pointer should be forwarded to 430 as well. Read done pointers are managed similarly to write done pointers, except that cache manager 452 might optionally send the read done pointer to SQM 430. When the read done pointer crosses a page boundary, page atomic module 451 sends a message to free the page over link 490 to pool management module 441.

Advantageously, the examples herein discuss various enhanced methods of handling growable data structure (stack/queue) resources, such as in graphics processors/GPUs. The growable data structures can comprise memory pages that form linked list structures. The buffer management elements can implement linked list structures to track pages in the growable data structures. Associated pointers are used by the growable data structures to link among pages that comprise the growable data structures. Buffer management elements can allocate and de-allocate memory pages into the linked list structure using pointers to free memory pages held in a separate free page list. The enhanced graphics processing operations herein provide for the ability to handle and track multiple different growable data structures which can be allocated or read from, among different shader elements or shader threads on-the-fly. Multiple simultaneous growable data structures can also be implemented when separation of data structure resources among shaders or shader threads is desired.

Figure 5:
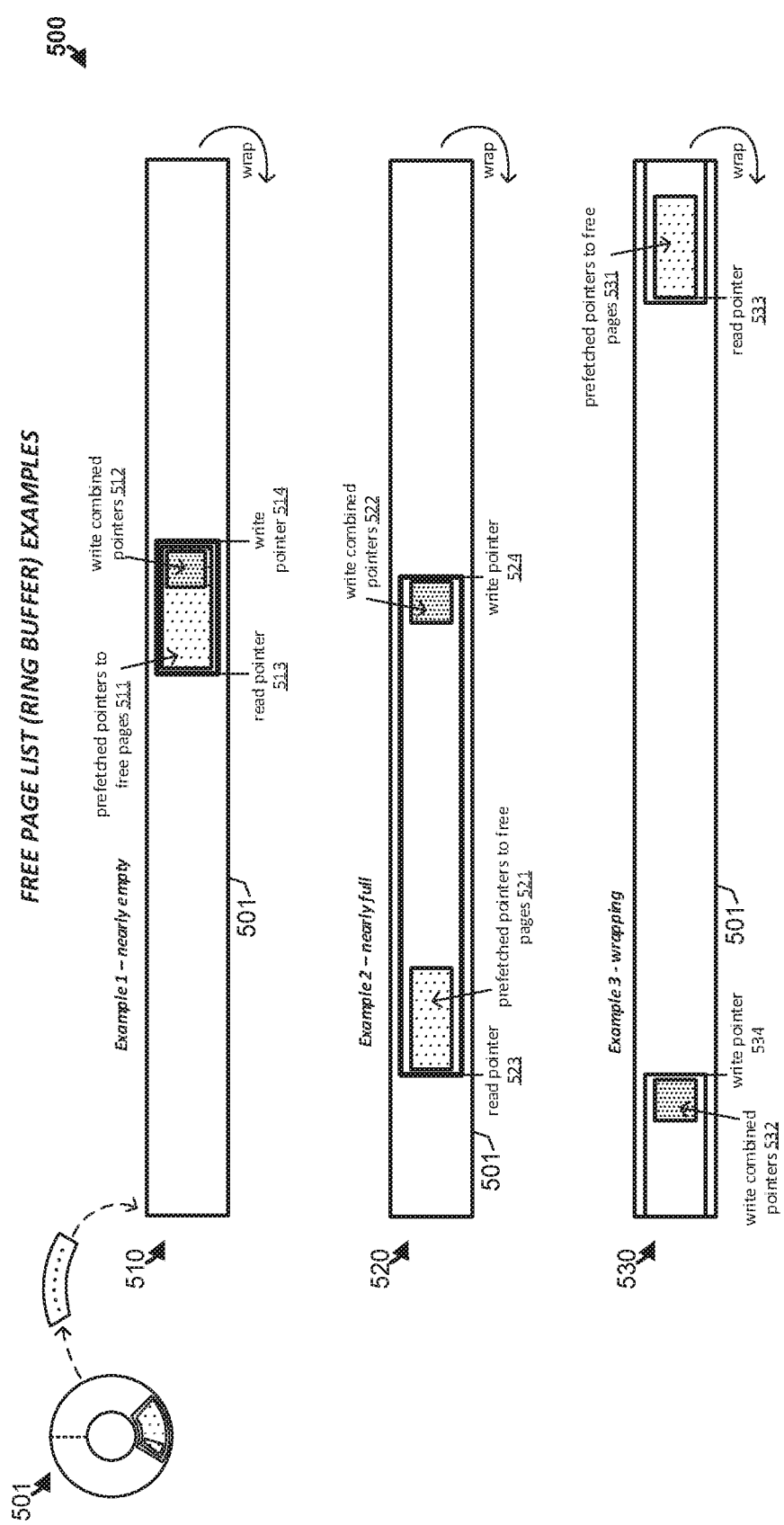
FIG. 5 illustrates example tracking structures in an implementation.

FIG. 5 illustrates example free page list/tracking structures 500 in an implementation. FIG. 5 is presented to illustrate an example free page list structure as a ring buffer 501. The examples 510, 520, and 530 in FIG. 5 are linear representations of a 'ring' structure of ring buffer 501, where the right-hand side of each example buffer wraps around to the left-hand side of the associated buffer to form a 'ring' structure. These ring buffers can comprise any predetermined allocation size, such as 8 kilobytes (KB), among other sizes. These ring buffers can reside in main memory, such as memory 464 in FIG. 4, or other memory locations for use by the buffer managers, SQMs, or pool managers discussed herein. In further examples, the free page list may be implemented as a stack/queue in the pool, such as another instance of a stack/queue 466. The free page list may reside in pool 465 (as a separate allocation), or it may reside elsewhere in main memory 464. In yet further examples, the free page list could reside elsewhere, such as fully located in on-chip cache 442. Other data structures than ring buffers can be used to track the free page list, such as bit arrays, where each bit of index N represents whether a page of index N is free or in-use. In the bit array implementation, the array would typically be located entirely on-chip, and the bit array memory would replace the free page list cache 442.

The ring examples in FIG. 5 can be employed by pool managers 440 of FIG. 4 for tracking free pages for use in the growable data structures. As more data is needed to be stored in the growable data structures, a ring buffer will indicate free pages via pointers to the pages, such as 8-byte pointers. The ring buffer might comprise 1000 or more entries in some examples (i.e. 1000 8-byte pointers), but such usage of the 1000 entries can vary as pages are allocated, used, and subsequently returned to the free page list. Thus, the free page list tracks pages that have not been allocated for use by the growable data structures (e.g. stacks/queues) discussed herein.

Pool managers 440 can prefetch pointers to pages from the free page list 467 for use by the growable data structures, and store pointers to the prefetched pages in the ring buffer (511, 521, 531). This prefetching can be performed responsive to detecting a threshold usage status of the prefetched pages, and responsively more pages prefetched of remaining valid pointers in free page list cache 442. It should be noted that the free page list tracks pointers to free pages for use by the stacks/queues. Since the stacks/queues comprise a linked list of pages, and these pages can be employed to grow a stack/queue structure, then new pages are linked to existing pages using pointers between the pages. When pages have been serviced and data drained, then the pages can be returned by the pool manager to the free page list as free pages for later use.

During an initial state, the free page list might initially be associated with 100 megabytes (MB) of memory that is subdivided into 'pages' representing sub-portions of the 100 MB. The free page list will hold pointers to each free page in memory, with memory addresses of the pages comprising the pointers. Pages can be allocated for use in the growable stacks/queues and these pages can be returned to the free page list once data has been consumed from the associated pages.

As pages are made available for stack/queue usage, a write pointer (514, 524, 534) will advance through the ring buffer, with a possibility of wrapping, as shown in example 530. A read pointer (513, 523, 533) will indicate where pointers for new stack/queue space (empty pages) are to be read from, and will advance as pages are allocated to the growable stacks/queues for data storage. Prefetched pointers to free pages (511, 521, 531) can also be employed, as shown in the example ring buffers of FIG. 5. Since pages might be used and returned to the ring buffer in random order, the pointers held in the ring buffer for free pages might become 'randomized' over time, even if initially placed into the ring buffer in order during initialization.

In first example 510, ring buffer 501 has a "nearly empty" condition shown. In a second example 520, ring buffer 501 has a "nearly full" condition shown, with the ring buffer indicating more available pages than example 510. In a third example 530, ring buffer 501 has a "wrapping" condition shown that has the pointers for available pages wrapping around a boundary of the ring buffer.

Write combined portions (512, 522, 532) are also indicated in the example ring buffers. These write combined portions are employed to efficiently handle when pointers for pages are pending to be pushed into the ring buffer for later re-use in stack/queue operations. To make efficient use of an associated memory bus to place these pointers back into the ring buffer, a burst of combined writes can be established. For example, if each pointer is represented by a DWORD chunk, these individual pointers might get released from service in the stacks/queues at a first, 'slow' pace. However, the pool manager might not want to immediately write each DWORD to memory. Typically, a memory bus for a GPU to main memory is wider than a DWORD size, so writing a DWORD immediately and singularly can waste memory bandwidth. Advantageously, the pool manager can buffer up the pointers to pages into a group (as the write combined data), and then burst write over the associated memory bus so as to fill up a whole associated memory bus transaction size, or to buffer up until some threshold condition initiates a flush of the write combined data. The burst might comprise 32 bytes or more, so 4 or more pointers of DWORD size can be included for return to the ring buffer at the same time.

Other implementations can manage the free page list without employing ring buffers. Although ring buffer approaches are typically more flexible, other implementations can be less complex to implement. In this example, the pool memory is required to be contiguous and subdivided into pages. The pool manager then stores one hit per page: the bit is set to '1' if the page is free, and '0' if it is in use. "Allocating" a page from the free page list relates to finding some non-zero bit in the bit array, returning the address of the corresponding page, and then zeroing that bit. "Freeing" a page relates to setting the corresponding bit=1 again. The implementation type of the free page list is somewhat less critical than the implementation of the "push_alloc/push_done/pop_alloc/pop_done" instructions, and the page cache. Although the hardware should still have some form of free page list implementation in order to implement the growable data structure features.

Figure 6:
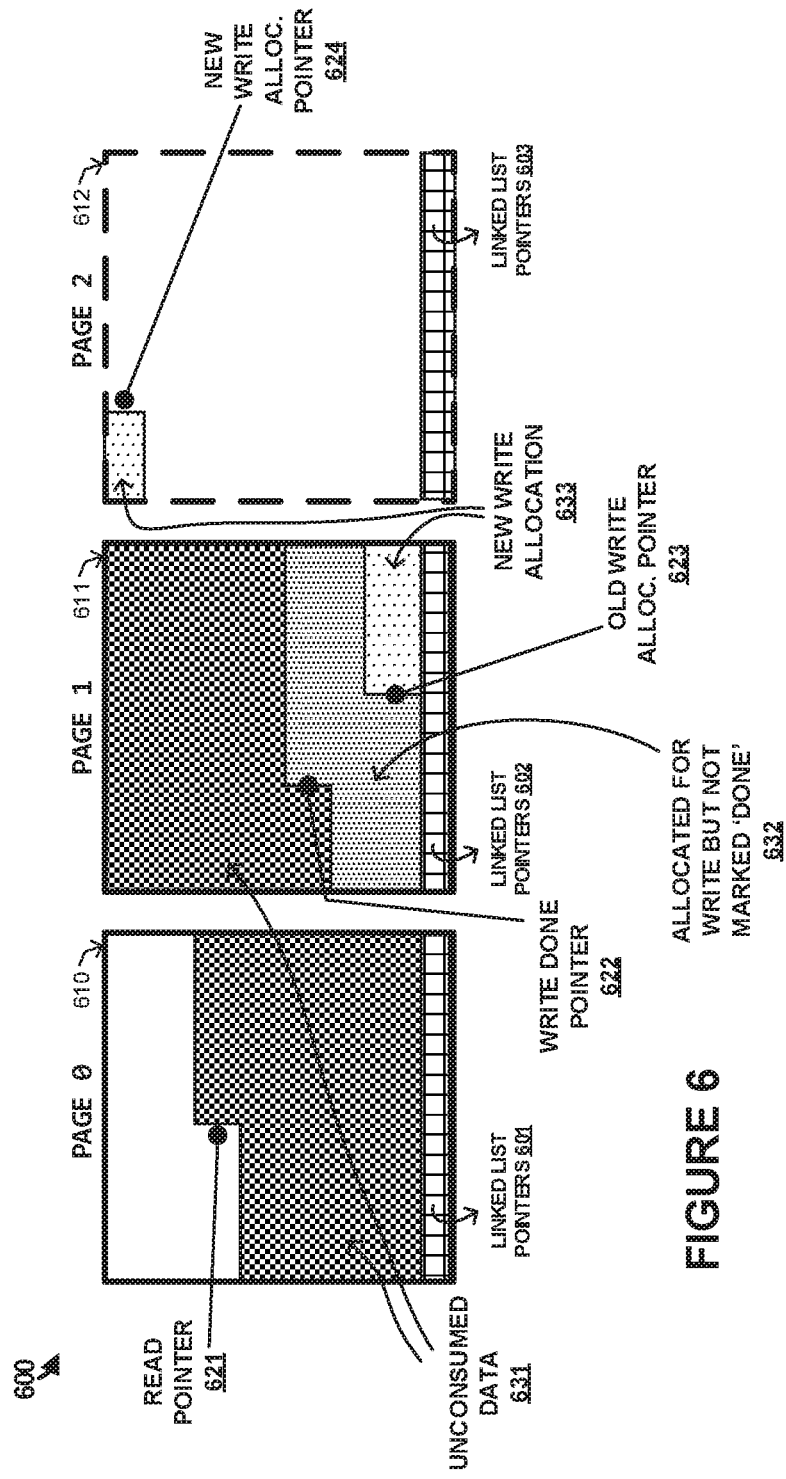
FIG. 6 illustrates an example growable data structure in an implementation.

FIG. 6 illustrates an example growable data structure in an implementation. FIG. 6 includes example data structure 600, such as those discussed herein and provided by a pool manager and SQM. The SQM and other associated elements can provide for enhanced "indirect" growable data structures, direct or indirect non-growable data structures (whether part of a pool or not), and direct growable data structures, among other operations and data structures.

In FIG. 6, a first page '0' (610) includes unconsumed data 631 which is held by data structure 600 prior to reading out according to the read pointer 621. This unconsumed data has been written into data structure 600 and write-confirmed, with the "write done" pointer 622 indicating the last 'safe' or confirmed element that can be read. A second page '1' (611) includes further unconsumed data along with "write done" pointer 622 that indicates a location of the last confirmed write data added to data structure 600. Portion 632 (located between 622 and 623), will be written out of order by shader units. Further space 632 is included in page 1 that has been allocated to write data that is currently in-process of being written, and not yet able to be read out. Space 632 is allocated for writes but have not yet been marked as done with writing. The "old alloc write pointer" 623 indicates a location for new data to be written into data structure 600. However, remaining space 633 in page 1 might not be sufficient for an incoming write to fit.

Data structure 600 is growable so that further data can be held in data structure 600 after initial allocation of space for data structure 600. To provide for the growable functionality, write allocation pointers can be employed to point to additional pages that become allocated as-needed as data is written into the data structures. Before the addition of new page '2' (612), old write allocation pointer 623 was included in page 1 to indicate the end of space either filled with write data or already allocated to incoming write data for data structure 600. Responsive to an additional page 612 of memory allocated for data structure 600, the write allocation pointer can point to a 'new' location 624 in data structure 600 which indicates the end of the current space allocation for data structure 600 after expansion to hold more data.

The growth of data structure 600 can be triggered upon writes to data structure 600 that might exceed the available space left in data structure 600 or a predetermined threshold amount of remaining space. For example, if further data is determined to not fit into page 1 in FIG. 6, then a pointer to new page 2 can be requested from the free page list and associated page space allocated for this further data. Data structure 600 can be shrunk or reduced in size as well as data is consumed and needs less space than previously. For example, once read pointer 621 progresses beyond page 0, then page 0 can be freed back into the free page list. Assuming the incoming new write exceeds the available space for page 1, then additional space is introduced into data structure 600 using page 2, and this space is indicated, by "new write allocation" 633 in FIG. 6. The "new write alloc pointer" 624 indicates where further writes can be stored, after the addition of page 2 into data structure 600. Pages can be removed or deallocated from use in data structure 600 responsive to consumption of data from data structure 600, and returned to a free page list for future use. Typically, the 'pool managers' discussed herein can handle the allocation and de-allocation of pages from data structure 600 using a free page list, such as ring buffer 501 discussed in FIG. 5.

Furthermore, each page 0, 1, 2 in FIG. 6 includes associated portions 601, 602, and 603 dedicated to linked list pointers which facilitate formation of data structure 600. In this example, data structure 600 data structure comprises a linked list of pages. The linked list pointers allow for sequential linking of pages to consecutive pages. This sequential linking of pages forms the structure of data structure 600, and as data structure 600 is grown, additional pages can be linked to existing pages using these pointers. The pointers to the pages (included in portions 601, 602, and 603) are allocated and deallocated as-needed (on-the-fly) using pointer information included in the free page list or 'ring buffers' discussed in FIG. 5. In one example, the first or last 'n' bytes of pages (such as 8 bytes can be reserved as portions 601, 602, and 603 to store pointers to next and/or previous pages. Alternatively, the linked list pointers can be implemented elsewhere, which allows the entire page size to be used for buffering data, instead of reserving a section of each page as portions 601, 602, and 603. Additionally, portions 601-603 can contain counts of outstanding reads and writes per page (and the write allocation pointer per-page) which can be used to help track write done pointer 622, and to track when to free the page. Pointers or other information included in portions 601-603 can be cached in the page header cache 453 in FIG. 4. Pointers or other information is typically only written out to memory 464 when page header cache 453 becomes full, or is flushed by controller 413.

Certain inventive aspects may be appreciated from the foregoing disclosure, of which the following are various examples.

Example 1

A method of handling data buffer resources in graphics processor, the method comprising establishing a pool of available memory pages tracked by memory pointers for use in a growable data structure. Responsive to requests by at least a shader unit of the graphics processor for space in the growable data structure in which to write shader data, the method includes providing to the shader unit at least write pointers to locations within memory pages from the growable data structure in accordance with data sizes indicated in the requests. Responsive to exceeding a threshold fullness of the growable data structure, the method includes allocating at least one further memory page from the pool of available memory pages for inclusion in the growable data structure.

Example 2

The method of Example 1, further comprising, responsive to the requests, processing the data sizes to determine if the shader data can fit into current pages of the growable data structure. Based on the shader data not able to fit into the current pages, the method includes providing to the shader unit first pointers indicating start locations in the growable data structure to begin writing the shader data, count information indicating quantities of the shader data able to be written in the current pages, and second pointers indicating at least one further page in the growable data structure into which the shader data can be spanned from the current pages.

Example 3

The method of Examples 1-2, further comprising receiving write completion messaging from the shader unit indicating quantities of data written into the at least one further page, and responsively updating corresponding pointers indicating the availability of the data for future read requests.

Example 4

The method of Examples 1-3, further comprising responsive to indications by the shader unit of consumption of the shader data in ones of the memory pages, the method includes returning the ones of the memory pages into the pool of available memory pages.

Example 5

The method of Examples 1-4, further comprising linking ones of the memory pages to each other in the growable data structure using page pointers included in a reserved portion of each of ones of the memory pages, wherein the page pointers each indicate at least a next page in the growable data structure.

Example 6

The method of Examples 1-5, wherein the memory pointers in the pool of available memory pages are tracked using at least a ring buffer configured to store pointers to the available memory pages not yet included in the growable data structure.

Example 7

The method of Examples 1-6, further comprising maintaining a write pointer into the growable data structure that indicates a location within the growable data structure to begin write operations for the shader data, and maintaining a read pointer into the growable data structure that indicates a location within the growable data structure to begin read operations for the shader data.

Example 8

The method of Examples 1-7, where the requests comprise at least one combined request that groups requests for a plurality of shader threads of at least a threadgroup of the shader unit. The method also includes processing the at least one combined request to determine a quantity of requested space for writing into the growable data structure. Based at least on the quantity of requested space, the method includes providing to the shader unit a start pointer indicating a start location in the growable data structure to begin writing shader data for the plurality of shader threads, count information indicating quantities of the shader data able to be written in a first page, and an additional pointer indicating at least one further page in the growable data structure into which the shader data can be spanned from the first page.

Example 9

The method of Examples 1, further comprising providing status of the growable data structure through a summarizer element configured to indicate at least a fullness status of the growable data structure, wherein a schedule is determined for further data operations for the growable data structure in accordance with at least the fullness status.

Example 10

A data buffer management service, comprising a pool manager configured to manage a pool of available memory pages tracked by memory pointers for use in a buffer data structure, and a buffer manager configured to receive write space requests issued by shader units of a graphics processor, and responsively provide to the shader units at least write pointers to locations within memory pages of the buffer data structure in accordance with data sizes indicated in the requests. The pool manager is further configured to allocate at least one further memory page for inclusion in the buffer data structure responsive to exceeding a threshold fullness of the buffer data structure.

Example 11

The data buffer management service of Example 10, comprising the buffer manager configured to process the data sizes indicated by the write space requests to determine if associated shader data can fit into current pages of the buffer data structure. Based on the shader data sizes exceeding available space in the current pages, the buffer manager is configured to provide to the shader units first pointers indicating start locations in the buffer data structure to begin writing the associated shader data, count information indicating quantities of the associated shader data able to be written in the current pages, and second pointers indicating at least one further page in the buffer data structure into which the associated shader data can be spanned from the current pages.

Example 12

The data buffer management service of Examples 10-11, comprising the buffer manager configured to receive write completion messaging from the shader units indicating quantities of data written into the at least one further page, and responsively update corresponding pointers indicating the start locations in the buffer data structure for further write space requests.

Example 13

The data buffer management service of Examples 10-12, comprising, responsive to indications by the shader unit of consumption of the shader data in ones of the memory pages, the pool manager configured to return the ones of the memory pages into the pool of available memory pages.

Example 14

The data buffer management service of Examples 10-13, comprising the buffer manager configured to link ones of the memory pages to each other in the buffer data structure using page pointers included in a reserved portion of each of the ones of the memory pages, wherein the page pointers each indicate at least a next page in the buffer data structure.

Example 15

The data buffer management service of Examples 10-14, wherein the memory pointers in the pool of available memory pages are tracked using at least a ring buffer configured to store pointers to the available memory pages not yet included in the buffer data structure.

Example 16

The data buffer management service of Examples 10-15, comprising the buffer manager configured to maintain a write pointer into the buffer data structure that indicates a location within the buffer data structure to begin write operations for shader data, and the buffer manager configured to maintain a read pointer into the buffer data structure that indicates a location within the buffer data structure to begin read operations for shader data.

Example 17

The data buffer management service of Examples 10-16, where the write space requests comprise at least one combined request that groups requests for a plurality of shader threads of at least a threadgroup of the shader unit. The buffer manager is configured to process the at least one combined request to determine a quantity of requested space for writing into the growable data structure. Based at least on the quantity of requested space, the buffer manager is configured to provide to the shader unit a start pointer indicating a start location in the growable data structure to begin writing shader data for the plurality of shader threads, count information indicating quantities of the shader data able to be written in a first page, and an additional pointer indicating at least one further page in the growable data structure into which the shader data can be spanned from the first page.

Example 18

The data buffer management service of Examples 10-17, further comprising a buffer summarizer element configured to provide status of the buffer data structure that indicates at least a fullness status of the buffer data structure, wherein a schedule is determined for further data operations for the buffer data structure in accordance with at least the fullness status.

Example 19

A graphics processing apparatus, comprising shader units configured to process shader data, and a buffer system configured to receive data handling requests from the shader units and responsively provide pointers to memory pages to the shader units for initiating storage and retrieval of the shader data within growable data structures. The buffer system is further configured to increase sizes of the growable data structures responsive to fullness status of the growable data structures by at least obtaining pointers to additional memory pages from a free page list that tracks free memory pages within a memory pool for use in the growable data structures, and forming a sequential linking among the additional memory pages to existing memory pages in associated growable data structures using pointers held in a reserved portion of at least the additional memory pages.

Example 20

The graphics processing apparatus of Example 19, comprising, for write requests among the data handling requests, the buffer system further configured to provide to the shader units write pointers indicating start locations in the growable data structures to begin writing associated shader data, count information indicating quantities of the associated shader data able to fit in memory pages corresponding to the write pointers, and second pointers indicating at least one of the additional memory pages into which the associated shader data can be spanned.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the invention is not limited to the specific implementations described above, but only by the claims and their equivalents.

What is claimed is:

1. A method of handling data buffer resources in graphics processor, the method comprising:
   establishing a pool of available memory pages tracked by memory pointers for use in a growable data structure;
   responsive to requests by at least a shader unit of the graphics processor for space in the growable data structure in which to write shader data, processing the data sizes indicated in the requests to determine if the shader data can fit into current pages of the growable data structure;
   based on the shader data being able to fit into the current pages, providing to the shader unit at least write pointers to locations within memory pages from the growable data structure in accordance with data sizes indicated in the requests;
   based on the shader data not being able to fit into the current pages, providing to the shader unit first pointers indicating start locations in the growable data structure to begin writing the shader data, count information indicating quantities of the shader data able to be written in the current pages, and second pointers indicating at least one additional page in the growable data structure into which the shader data can be spanned from the current pages; and
   responsive to exceeding a threshold fullness of the growable data structure, allocating the at least one additional page from the pool of available memory pages for inclusion in the growable data structure.

2. The method of claim 1, further comprising:
   receiving write completion messaging from the shader unit indicating quantities of data written into the at least one further page, and responsively updating corresponding pointers indicating the availability of the data for future read requests.

3. The method of claim 1, further comprising:
   responsive to indications by the shader unit of consumption of the shader data in ones of the memory pages, returning the ones of the memory pages into the pool of available memory pages.

4. The method of claim 1, further comprising:
   linking ones of the memory pages to each other in the growable data structure using page pointers included in a reserved portion of each of ones of the memory pages, wherein the page pointers each indicate at least a next page in the growable data structure.

5. The method of claim 1, wherein the memory pointers in the pool of available memory pages are tracked using at least a ring buffer configured to store pointers to the available memory pages not yet included in the growable data structure.

6. The method of claim 1, further comprising:
   maintaining a write pointer into the growable data structure that indicates a location within the growable data structure to begin write operations for the shader data; and
   maintaining a read pointer into the growable data structure that indicates a location within the growable data structure to begin read operations for the shader data.

7. The method of claim 1, wherein the requests comprise at least one combined request that groups requests for a plurality of shader threads of at least a threadgroup of the shader unit, and further comprising:
   processing the at least one combined request to determine a quantity of requested space for writing into the growable data structure; and
   based at least on the quantity of requested space, providing to the shader unit a start pointer indicating a start location in the growable data structure to begin writing shader data for the plurality of shader threads, count information indicating quantities of the shader data able to be written in a first page, and an additional pointer indicating at least one further page in the growable data structure into which the shader data can be spanned from the first page.

8. The method of claim 1, further comprising:
   providing status of the growable data structure through a summarizer element configured to indicate at least a fullness status of the growable data structure, wherein a schedule is determined for further data operations for the growable data structure in accordance with at least the fullness status.

9. A data buffer management service, comprising:
   a pool manager configured to manage a pool of available memory pages tracked by memory pointers for use in a buffer data structure;
   a buffer manager configured to receive write space requests issued by shader units of a graphics processor, and responsively process data sizes indicated in the write space requests to determine if associated shader data can fit into current pages of the buffer data structure;
   based on the associated shader data being able to fit into the current pages, the buffer manager configured to provide to the shader units at least write pointers to locations within memory pages of the buffer data structure in accordance with data sizes indicated in the requests;
based on the shader data sizes exceeding available space in the current pages, the buffer manager configured to provide to the shader units first pointers indicating start locations in the buffer data structure to begin writing the associated shader data, count information indicating quantities of the associated shader data able to be written in the current pages, and second pointers indicating at least one additional page in the buffer data structure into which the associated shader data can be spanned from the current pages; and
the pool manager configured to allocate the at least one additional page for inclusion in the buffer data structure responsive to exceeding a threshold fullness of the buffer data structure.

10. The data buffer management service of claim 9, comprising:
the buffer manager configured to receive write completion messaging from the shader units indicating quantities of data written into the at least one further page, and responsively update corresponding pointers indicating the start locations in the buffer data structure for further write space requests.

11. The data buffer management service of claim 9, comprising:
responsive to indications by the shader unit of consumption of the shader data in ones of the memory pages, the pool manager configured to return the ones of the memory pages into the pool of available memory pages.

12. The data buffer management service of claim 9, comprising:
the buffer manager configured to link ones of the memory pages to each other in the buffer data structure using page pointers included in a reserved portion of each of the ones of the memory pages, wherein the page pointers each indicate at least a next page in the buffer data structure.

13. The data buffer management service of claim 9, wherein the memory pointers in the pool of available memory pages are tracked using at least a ring buffer configured to store pointers to the available memory pages not yet included in the buffer data structure.

14. The data buffer management service of claim 9, comprising:
the buffer manager configured to maintain a write pointer into the buffer data structure that indicates a location within the buffer data structure to begin write operations for shader data; and
the buffer manager configured to maintain a read pointer into the buffer data structure that indicates a location within the buffer data structure to begin read operations for shader data.

15. The data buffer management service of claim 9, wherein the write space requests comprise at least one combined request that groups requests for a plurality of shader threads of at least a threadgroup of the shader unit, and further comprising:
the buffer manager configured to process the at least one combined request to determine a quantity of requested space for writing into the growable data structure; and
based at least on the quantity of requested space, the buffer manager configured to provide to the shader unit a start pointer indicating a start location in the growable data structure to begin writing shader data for the plurality of shader threads, count information indicating quantities of the shader data able to be written in a first page, and an additional pointer indicating at least one further page in the growable data structure into which the shader data can be spanned from the first page.

16. The data buffer management service of claim 9, further comprising:
a summarizer element configured to provide status of the buffer data structure that indicates at least a fullness status of the buffer data structure, wherein a schedule is determined for further data operations for the buffer data structure in accordance with at least the fullness status.

17. A graphics processing apparatus, comprising:
shader units configured to process shader data;
a buffer system configured to receive data handling requests from the shader units and responsively process data sizes indicated in the data handling requests to determine if associated shader data can fit into current pages of one or more growable data structures;
based on the shader data being able to fit into the current pages, the buffer system configured to provide pointers to memory pages to the shader units for initiating storage and retrieval of the shader data within the one or more growable data structures; and
based on the shader data not being able to fit into the current pages, the buffer system configured to provide to the shader units write pointers indicating start locations in the one or more growable data structures to begin writing associated shader data, count information indicating quantities of the associated shader data able to fit in memory pages corresponding to the write pointers, and second pointers indicating additional memory pages into which the associated shader data can be spanned; and
the buffer system configured to increase sizes of the growable data structures responsive to fullness status of the growable data structures by at least obtaining pointers to additional memory pages from a free page list that tracks free memory pages within a memory pool for use in the growable data structures, and forming a sequential linking among the additional memory pages to existing memory pages in associated growable data structures using pointers held in a reserved portion of at least the additional memory pages.

* * * * *